US010465757B2

(12) United States Patent
Vora et al.

(10) Patent No.: US 10,465,757 B2
(45) Date of Patent: Nov. 5, 2019

(54) SYSTEM AND METHOD FOR ADAPTIVE ENGAGEMENT CONTROL OF A PTO CLUTCH OF A WORK VEHICLE

(71) Applicant: CNH Industrial America, LLC, New Holland, PA (US)

(72) Inventors: Kushan Vora, Westmont, IL (US); Haibo Guo, Naperville, IL (US); Brian A. Hartman, Valparaiso, IN (US)

(73) Assignee: CNH Industrial America LLC, New Holland, PA (US)

( * ) Notice: Subject to any disclaimer, the term of this patent is extended or adjusted under 35 U.S.C. 154(b) by 170 days.

(21) Appl. No.: 15/736,231

(22) PCT Filed: May 13, 2015

(86) PCT No.: PCT/US2015/030470
§ 371 (c)(1),
(2) Date: Dec. 13, 2017

(87) PCT Pub. No.: WO2016/182566
PCT Pub. Date: Nov. 17, 2016

(65) Prior Publication Data
US 2018/0187728 A1 Jul. 5, 2018

(51) Int. Cl.
*F16D 48/06* (2006.01)
*A01B 71/06* (2006.01)
(Continued)

(52) U.S. Cl.
CPC .............. *F16D 48/06* (2013.01); *A01B 71/06* (2013.01); *A01B 71/063* (2013.01);
(Continued)

(58) Field of Classification Search
CPC . Y10T 477/75; Y10T 477/755; Y10T 477/78; B60W 30/186; B60W 30/1888;
(Continued)

(56) References Cited

U.S. PATENT DOCUMENTS 4,760,902 A * 8/1988 Bellanger .............. B60K 17/28
192/103 F
5,036,729 A * 8/1991 Nitz ...................... B60W 30/18
477/148
(Continued)

FOREIGN PATENT DOCUMENTS

EP 1580062 A2 * 9/2005 ........ B60W 30/1888
GB 2486730 6/2012

OTHER PUBLICATIONS

International Searching Authority PCT/US2015/030470 Dated Feb. 15, 2016 (9 pages).

*Primary Examiner* — Roger L Pang
(74) *Attorney, Agent, or Firm* — Rickard K. DeMille; Rebecca L. Henkel

(57) ABSTRACT

A method for controlling engagement of a power take-off (PTO) clutch of a work vehicle may generally include transmitting, by a computing device, a control signal associated with initiating engagement of the PTO clutch, determining a clutch slippage energy generated during engagement of the PTO clutch due to clutch slippage and, while the PTO clutch is getting engaged, calculating a clutch engagement time remaining until engagement of the PTO clutch is completed based on the clutch slippage energy and a maximum clutch engagement energy associated with the PTO clutch. In addition, the method may include determining a torque command for controlling engagement of the PTO clutch as a function of the remaining clutch engagement time and controlling the engagement of the PTO clutch based on the torque command.

20 Claims, 5 Drawing Sheets

(51) Int. Cl.
  *B60W 30/186* (2012.01)
  *B60W 30/188* (2012.01)

(52) U.S. Cl.
  CPC ....... *B60W 30/186* (2013.01); *B60W 30/1888* (2013.01); *F16D 2500/1045* (2013.01); *F16D 2500/10437* (2013.01); *F16D 2500/111* (2013.01); *F16D 2500/3067* (2013.01); *F16D 2500/30406* (2013.01); *F16D 2500/30415* (2013.01); *F16D 2500/30421* (2013.01); *F16D 2500/30426* (2013.01); *F16D 2500/50287* (2013.01); *F16D 2500/7044* (2013.01); *F16D 2500/7061* (2013.01); *F16D 2500/70412* (2013.01); *Y10T 477/75* (2015.01); *Y10T 477/755* (2015.01); *Y10T 477/78* (2015.01)

(58) Field of Classification Search
  CPC ............. F16D 48/06; F16D 2500/1045; F16D 2500/111; F16D 2500/30406; F16D 2500/30415; F16D 2500/30421; F16D 2500/30426; F16D 2500/3067; F16D 2500/50287; F16D 2500/70412; F16D 2500/7044; F16D 2500/10437; F16D 2500/7061
  USPC .............................................. 701/60, 66, 68
  See application file for complete search history.

(56) References Cited

U.S. PATENT DOCUMENTS

| 5,549,185 | A | | 8/1996 | Kale | |
|---|---|---|---|---|---|
| 8,364,363 | B2 | * | 1/2013 | Nakamura | B60K 25/06 |
| | | | | | 701/50 |
| 2009/0306868 | A1 | * | 12/2009 | Akebono | F16H 61/061 |
| | | | | | 701/60 |

* cited by examiner

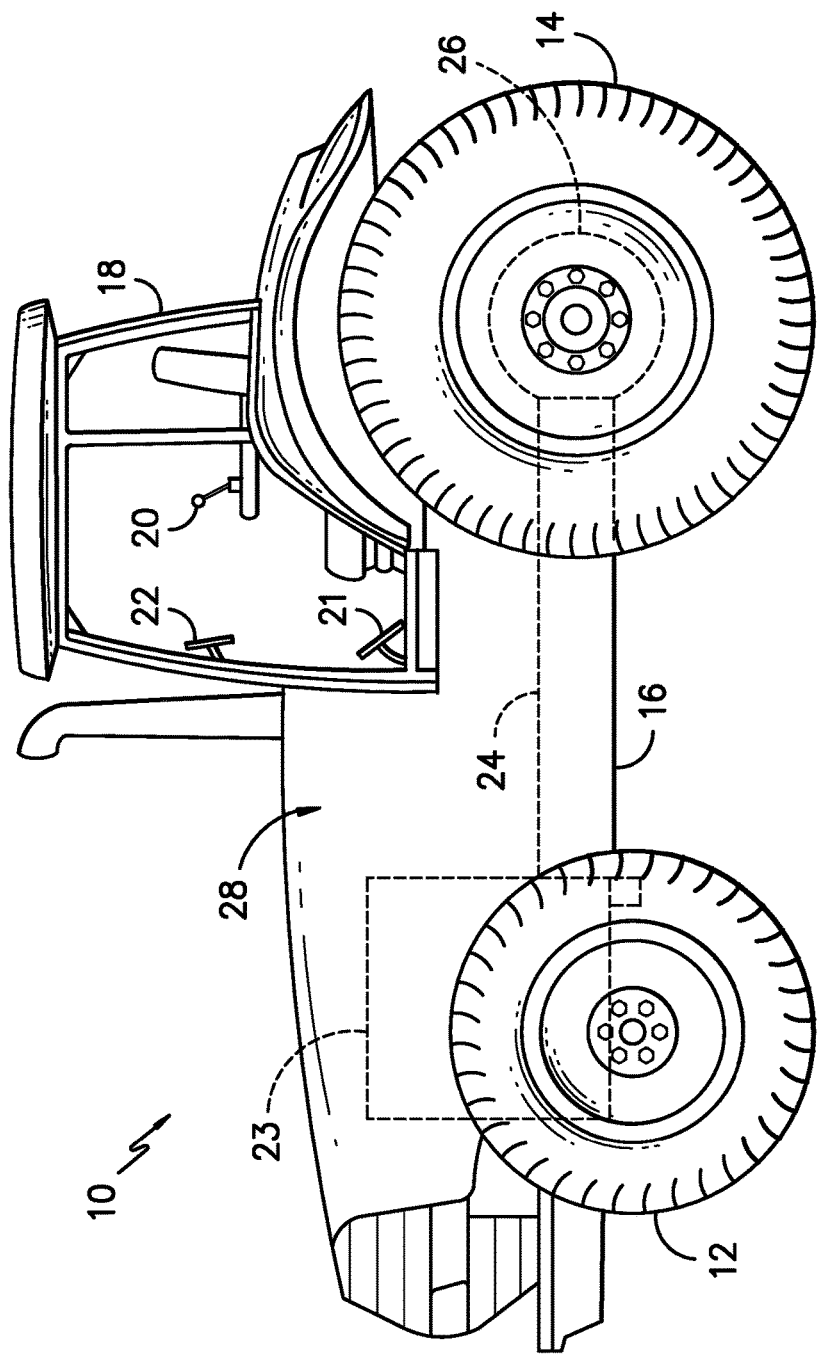
FIG. -1-

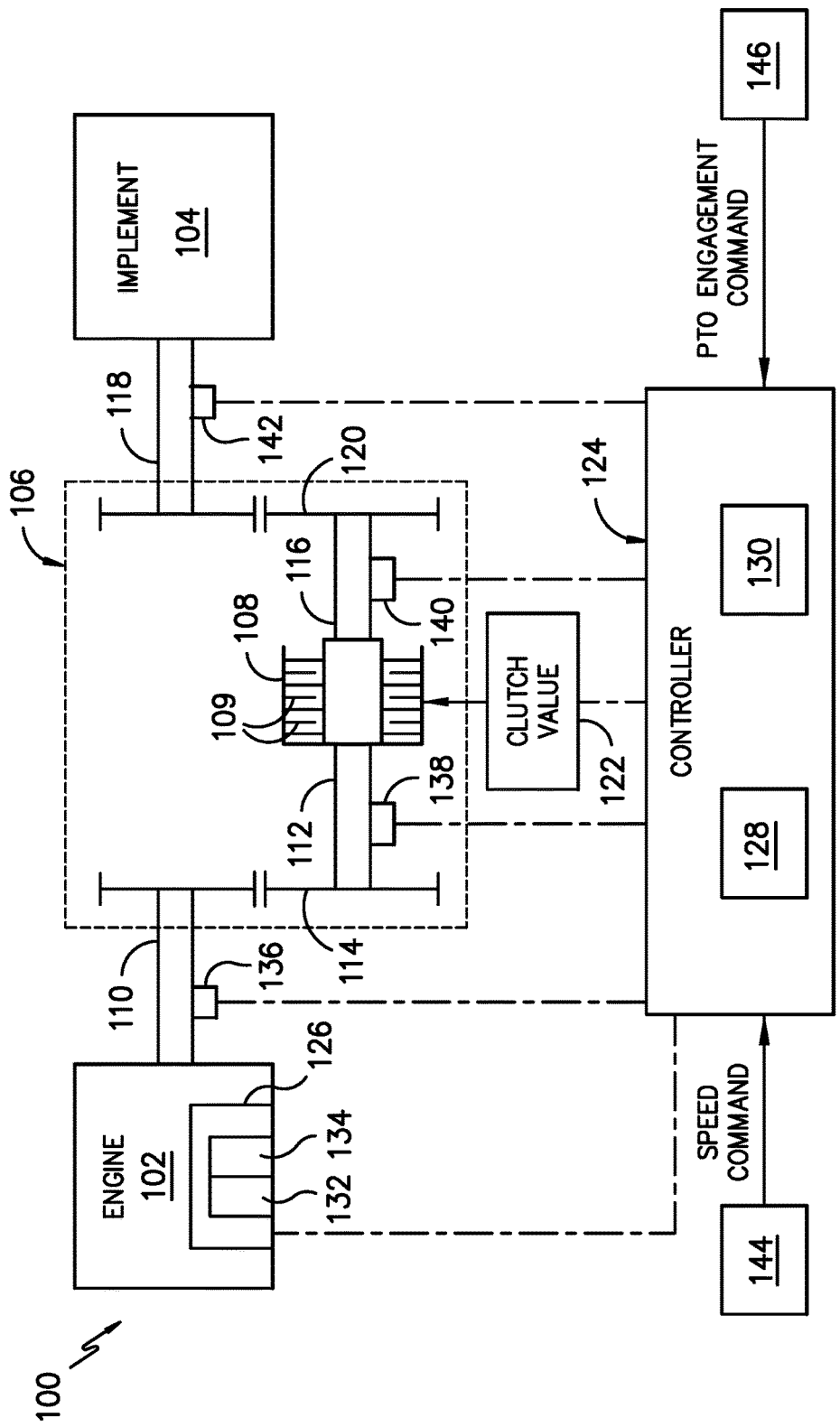
FIG. -2-

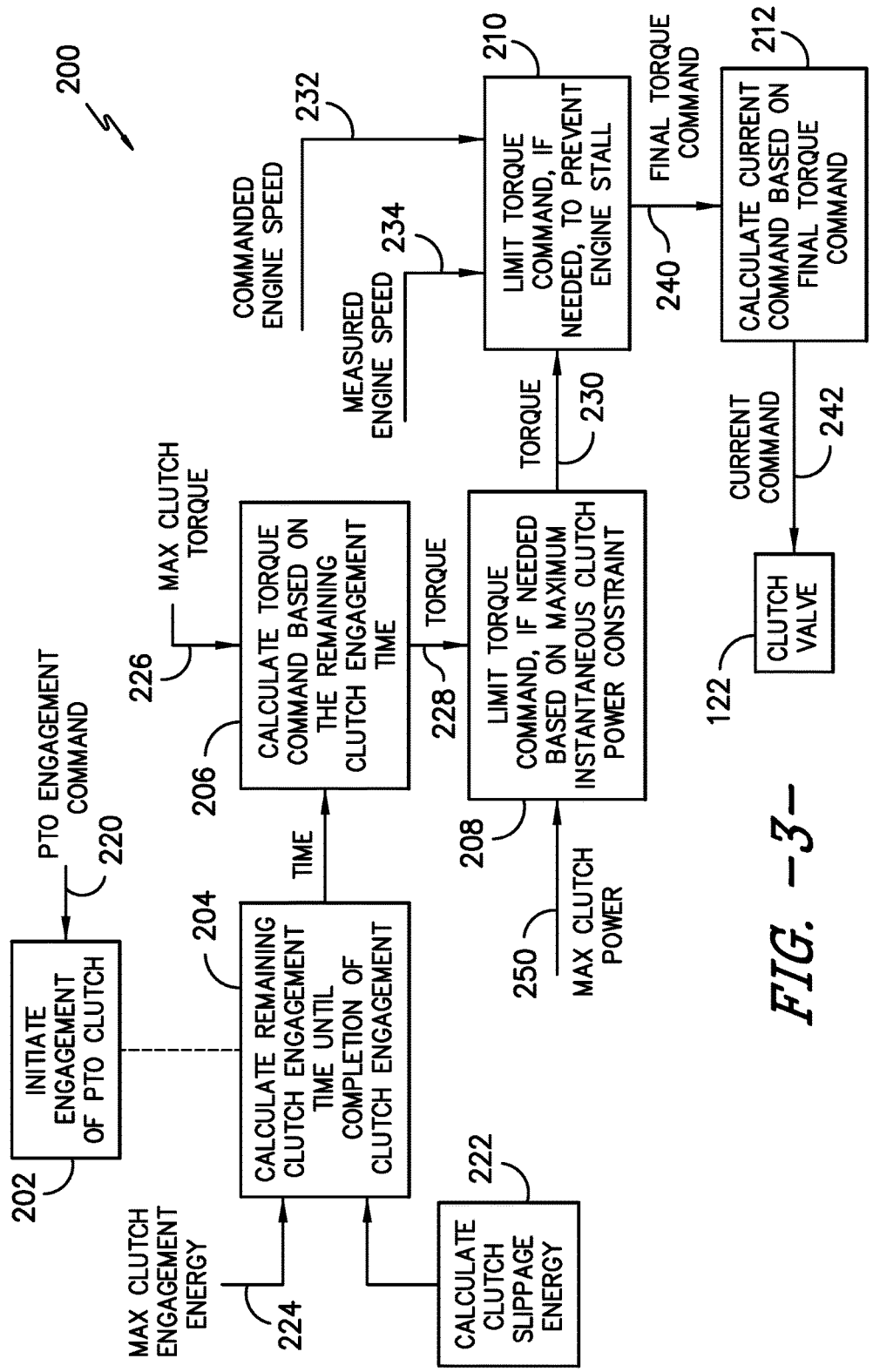
FIG. -3-

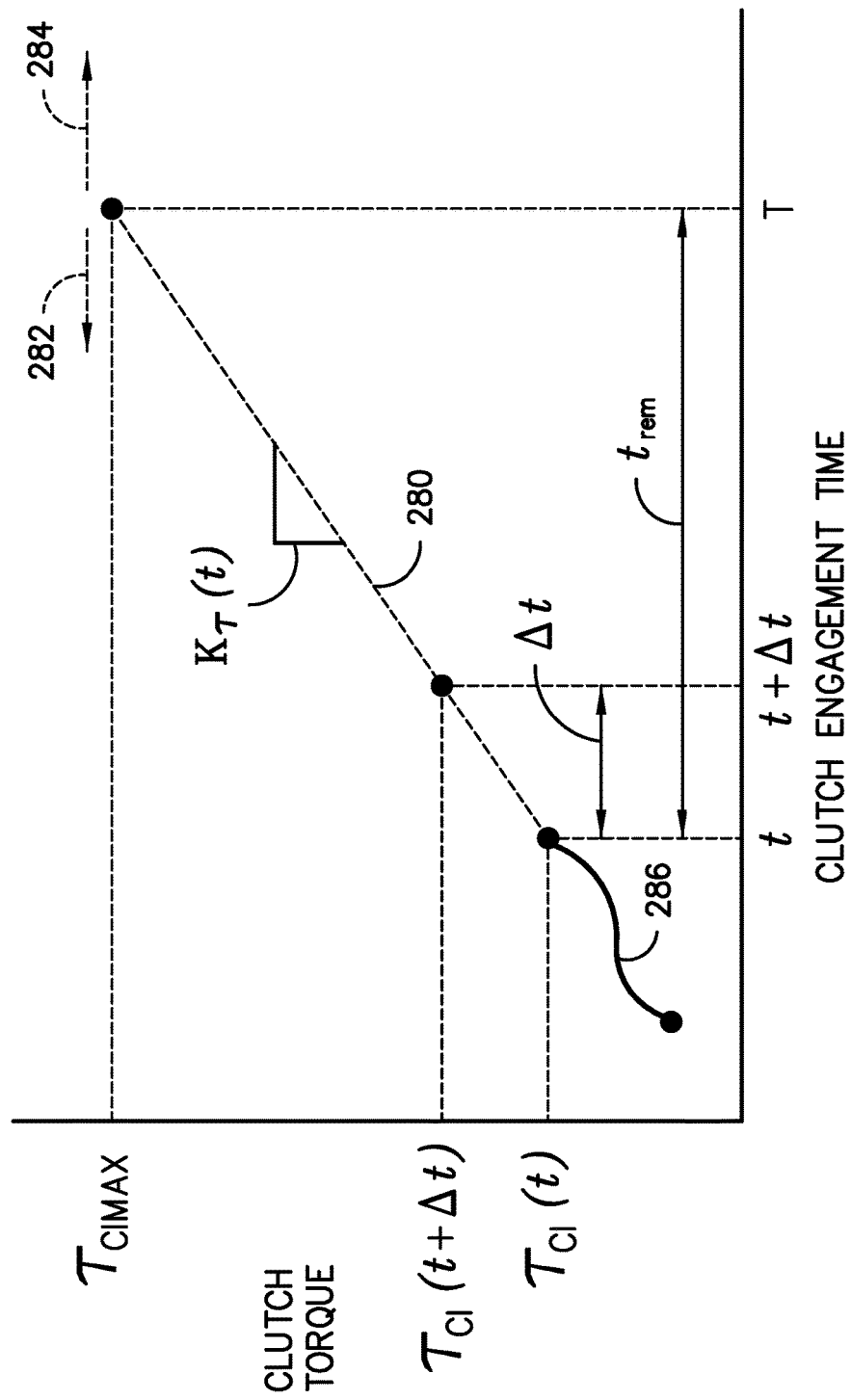
FIG. -4-

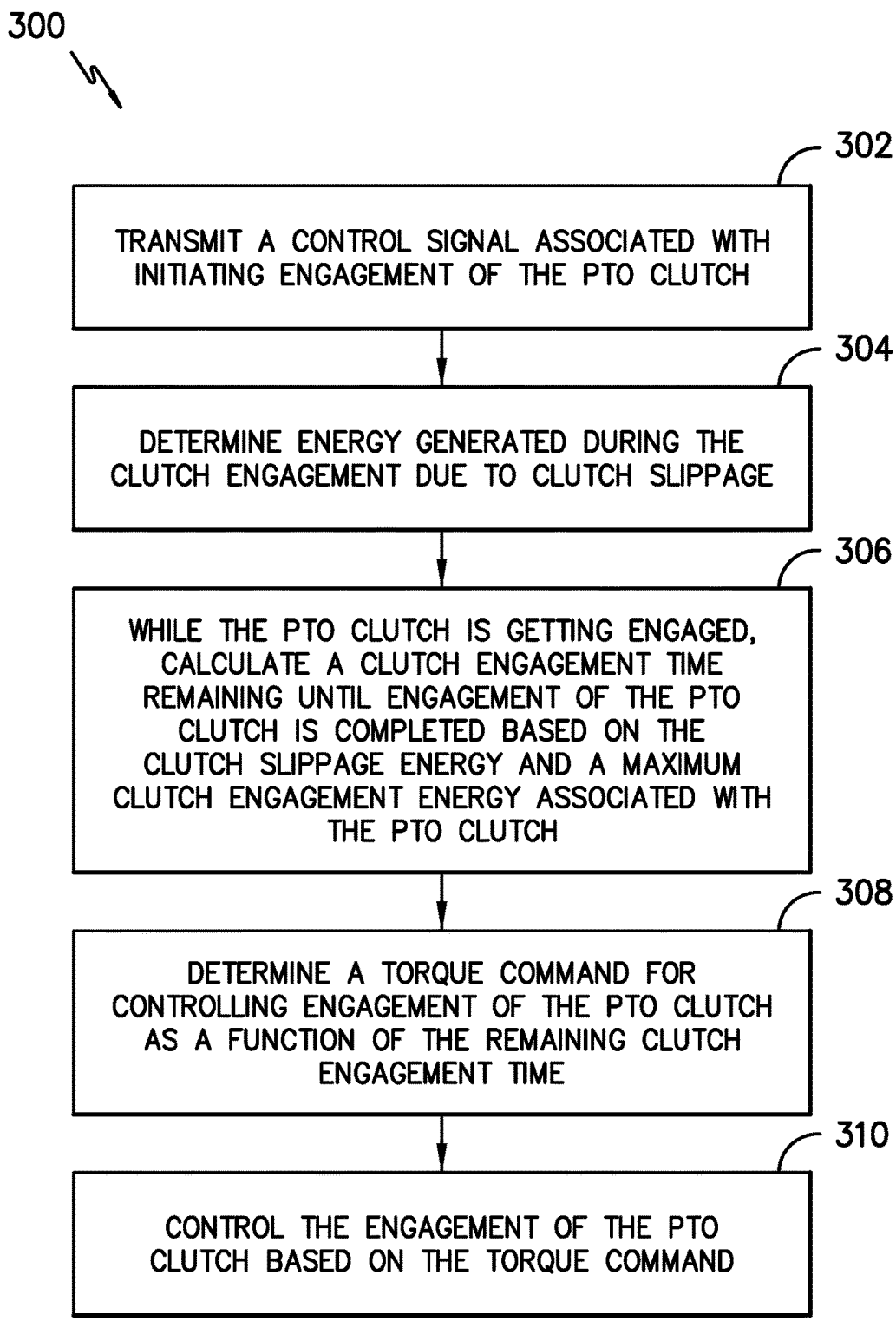
FIG. -5-

SYSTEM AND METHOD FOR ADAPTIVE ENGAGEMENT CONTROL OF A PTO CLUTCH OF A WORK VEHICLE

FIELD OF THE INVENTION

The present subject matter relates generally to work vehicles and, more particularly, to a system and method for providing adaptive control of the engagement of a power take-off (PTO) clutch for a work vehicle in order to accommodate differing implement inertial loads.

BACKGROUND OF THE INVENTION

Current work vehicles, such as tractors and other agricultural vehicles, include an engine and a transmission, such as a power shift transmission (PST) or a continuously variable transmission (CVT), rotatably coupled to the engine. In addition, work vehicles typically include an electronic controller that is configured to control the operation of the engine and the transmission to achieve desired operation. For example, an operator may provide an input to the controller selecting a desired ground speed for the work vehicle. Based on the operator input, the controller may be configured to automatically control the operation of the engine and/or the transmission such that the actual speed of the work vehicle matches the desired speed selected by the operator.

Additionally, work vehicles often include a power take-off (PTO) that is used to provide power to various implements, such as mowers, balers, forage harvesters and spreaders. Typically, PTOs are selectively connectable to a source of rotational power, such as the vehicle's engine, by a clutch that is configured to be automatically controlled via the electronic controller of the work vehicle. To date, many PTO clutch control systems have been developed that operate under a variety of control strategies designed to provide suitable functionality. However, it has been found that these conventional clutch control systems lack the ability to precisely control the engagement of the PTO clutch across a wide range of implement inertial loads. As a result, when a large inertial load is getting engaged to the PTO, current clutch control systems often control the engagement of the PTO clutch in a manner that results in engine stall and/or damage occurring to the clutch.

Accordingly, an improved system and method for controlling the engagement of a PTO clutch of a work vehicle that allows for stable clutch engagement across a range of implement inertial loads without stalling the engine and/or damaging the clutch would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for controlling engagement of a power take-off (PTO) clutch of a work vehicle. The method may generally include transmitting, by a computing device, a control signal associated with initiating engagement of the PTO clutch, determining a clutch slippage energy generated during engagement of the PTO clutch due to clutch slippage and, while the PTO clutch is getting engaged, calculating a clutch engagement time remaining until engagement of the PTO clutch is completed based on the clutch slippage energy and a maximum clutch engagement energy associated with the PTO clutch. In addition, the method may include determining a torque command for controlling engagement of the PTO clutch as a function of the remaining clutch engagement time and controlling the engagement of the PTO clutch based on the torque command.

In another aspect, the present subject matter is directed to a system for controlling clutch engagement for a work vehicle. The system may generally include a power take-off (PTO) clutch configured to rotationally couple a PTO input shaft to a PTO output shaft and a clutch valve configured to control engagement of the PTO clutch. In addition, the system may include a controller communicatively coupled to the clutch valve. The controller may include a processor and associated memory. The memory may store instructions that, when implemented by the processor, configure the controller to transmit a control signal associated with initiating engagement of the PTO clutch, determine a clutch slippage energy generated during engagement of the PTO clutch due to clutch slippage and, while the PTO clutch is getting engaged, calculate a clutch engagement time remaining until engagement of the PTO clutch is completed based on the clutch slippage energy and a maximum clutch engagement energy associated with the PTO clutch. Moreover, the controller may be configured to determine a torque command for controlling engagement of the PTO clutch as a function of the remaining clutch engagement time and control the engagement of the PTO clutch based on the torque command.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a side view of one embodiment of a work vehicle in accordance with aspects of the present subject matter;

FIG. 2 illustrates a schematic view of one embodiment of a system for controlling the engagement of a PTO clutch of a work vehicle in accordance with aspects of the present subject matter;

FIG. 3 illustrates a flow diagram of one embodiment of a control algorithm configured to be implemented by a controller of a work vehicle for controlling the engagement of a PTO clutch of the work vehicle in accordance with aspects of the present subject matter;

FIG. 4 illustrates a graphical view of one embodiment of a relationship that may be established between the PTO engagement time and the PTO clutch torque to allow a new torque command for the clutch to be calculated in accordance with aspects of the present subject matter; and FIG. 5 illustrates a flow diagram of one embodiment of a method for controlling the engagement of a PTO clutch of a work vehicle in accordance with aspects of the present subject matter.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for improved control of the engagement of a PTO clutch of a work vehicle as the clutch is getting engaged to transfer power between the engine and an associated implement of the work vehicle. Specifically, in several embodiments, the current command supplied to a clutch valve associated with the PTO clutch may be dynamically adjusted in a manner that allows for desired clutch engagement to be achieved for a large range of implement inertial loads, including a range incorporating both relatively low inertial loads and relatively high inertial loads. For example, using the disclosed system and method, the clutch current may be modulated in a manner that minimizes engine lug-down while maintaining both the instantaneous clutch power and the total clutch engagement energy for the PTO clutch below predefined thresholds during engagement of the clutch regardless of the magnitude of the implement inertial load.

In several embodiments, the current commands supplied to the clutch valve may be generated by a controller of the work vehicle. Specifically, the controller may be configured to implement a suitable control algorithm for generating the current commands in a manner consistent with the disclosure provider herein. For example, during engagement of the PTO clutch, the controller may be configured to periodically (e.g., every 5 or 10 g milliseconds) calculate a value corresponding to the estimated time remaining to complete the PTO clutch engagement. As will be described below, this remaining clutch engagement time may be calculated based on both a clutch slippage energy value corresponding to the energy generated due to slippage of the PTO clutch plates at each timestamp during the PTO engagement and a predetermined clutch energy value corresponding to the maximum total energy that the PTO clutch is configured to handle across time period along which the clutch is getting engaged. Based on the calculated time remaining for clutch engagement, the controller may then be configured to calculate a new clutch torque command to further engage the PTO clutch. The calculated torque command may then be converted to a final current command for controlling the operation of the clutch valve.

Additionally, in several embodiments, the clutch torque command calculated based on the remaining clutch engagement time may be limited, as needed, based one or more parameters prior to being converted to the final torque command to be transmitted to the clutch valve. For example, in one embodiment, the calculated torque command may be limited to ensure that the resulting instantaneous clutch power does not exceed a maximum instantaneous clutch power constraint defined for the PTO clutch. In addition, or as an alternative thereto, the calculated torque command may be limited to prevent stalling of the engine. For instance, in one embodiment, if the speed differential between the commanded engine speed and the actual engine speed exceeds a predefined threshold, the calculated torque command may be limited to minimize and/or prevent engine lug-down.

Referring now to the drawings, FIG. 1 illustrates a side view of one embodiment of a work vehicle 10. As shown, the work vehicle 10 is configured as an agricultural tractor. However, in other embodiments, the work vehicle 10 may be configured as any other suitable work vehicle known in the art, such as various other agricultural vehicles, earth-moving vehicles, loaders and/or various other off-road vehicles.

As shown in FIG. 1, the work vehicle 10 includes a pair of front wheels 12, a pair or rear wheels 14 and a chassis 16 coupled to and supported by the wheels 12, 14. An operator's cab 18 may be supported by a portion of the chassis 16 and may house various control or input devices 20, 21, 22 (e.g., levers, pedals, control panels, buttons and/or the like) for permitting an operator to control the operation of the work vehicle 10. For instance, as shown in FIG. 1, the work vehicle 10 may include an input lever 20 for controlling the engine speed of the vehicle 10 and a clutch pedal 21. In addition, the work vehicle 10 may include a control panel 22 for displaying message windows and/or alerts to the operator and/or for allowing the operator to interface with the vehicle's controller. For instance, in one embodiment, the control panel 22 may include buttons, knobs and/or any other suitable input devices that allow the operator to provide user inputs to the controller, such as by allowing the operator to provide a PTO engagement input instructing the controller to engage a PTO clutch (not shown in FIG. 1) of the work vehicle 10.

Moreover, the work vehicle 10 may also include an engine 23 and a transmission 24 mounted on the chassis 16. The transmission 24 may be operably coupled to the engine 23 and may provide variably adjusted gear ratios for transferring engine power to the wheels 14 via a drive axle assembly 26. The engine 23, transmission 24, and drive axle assembly 26 may collectively define a drivetrain 28 of the work vehicle 10.

It should be appreciated that the configuration of the work vehicle 10 described above and shown in FIG. 1 is provided only to place the present subject matter in an exemplary field of use. Thus, it should be appreciated that the present subject matter may be readily adaptable to any manner of work vehicle configuration. For example, in an alternative embodiment, a separate frame or chassis may be provided to which the engine 23, transmission 24, and differential 26 are coupled, a configuration common in smaller tractors. Still other configurations may use an articulated chassis to steer the work vehicle 10, or rely on tracks in lieu of the wheels 12, 14. Additionally, as will be described below, the work vehicle 10 may also be configured to be operably coupled to any suitable type of work implement.

Referring now to FIG. 2, a schematic diagram of one embodiment of a system 100 for controlling the clutch engagement of a power take-off (PTO) of a work vehicle 10 is illustrated in accordance with aspects of the present subject matter. As shown, the system 100 may include an engine 102 (e.g., the engine 23 of the work vehicle 10 described above) rotatably coupled to an implement 104 via a power take-off (PTO) system 106. In general, the PTO system 106 may be configured to transfer power from the engine 102 to the implement 104 so as to rotationally drive the implement 104. It should be appreciated that the implement 104 may generally correspond to any suitable implement configured to be coupled to a given work vehicle. For example, common PTO-driven implements include, but are not limited to, balers, mowers, grinder mixers, augers, drills, blowers, feeders and/or the like.

As shown in FIG. 2, the PTO system 106 may include a PTO clutch 108 configured to selectively couple the engine 102 to the corresponding PTO-driven implement 104. Specifically, as shown in the illustrated embodiment, an output shaft 110 of the engine 102 may be rotatably coupled to a PTO clutch input shaft 112 of the PTO clutch 108 (e.g., via one or more PTO input gears 114), which is, in turn, configured to be rotatably engaged with a corresponding PTO clutch output shaft 116 of the PTO system 106 via the PTO clutch 108. Additionally, the PTO clutch output shaft 116 may be rotatably coupled to a corresponding implement input shaft 118 (e.g., via one or more PTO output gears 120). Thus, by engaging the PTO clutch 108 such that the PTO clutch input and output shafts 112, 116 are rotatably coupled to one another, power from the engine 102 may be transmitted through the PTO system 106 to the implement 104. Similarly, power transmission from the engine 102 to the implement 104 may be cut-off by disengaging the PTO clutch 108 such that the PTO clutch input and output shafts 112, 116 are effectively decoupled from one another. As is generally understood, the PTO clutch 108 may include a plurality of PTO clutch plates 109 configured to be engaged within the clutch 108 for transmitting torque between the PTO clutch input and output shafts 112, 116.

In several embodiments, the PTO clutch 108 may correspond to a hydraulically-actuated clutch. Thus, as shown in FIG. 2, the system 100 may also include a clutch valve 122 (e.g., a current-controlled pressure reducing valve) configured to regulate the supply of hydraulic fluid to the PTO clutch 108, thereby allowing for the engagement and disengagement of the clutch 108 to be controlled. For example, as will be described below, the current supplied to the clutch valve 122 may be directly proportional to the pressure of the hydraulic fluid supplied to the PTO clutch 108, which is, in turn, proportional to the amount of torque transmitted through the clutch 108.

It should be appreciated that the configuration of the PTO system 106 shown in FIG. 2 is simply provided to illustrate one example of a suitable PTO configuration. In general, the system and method described herein may be applied to control the clutch engagement of a PTO system having any suitable configuration that allows power to be transmitted from the engine of a work vehicle to an associated implement, including any of the various PTO system configurations currently known in the art. It should also be appreciated that a work vehicle may be configured to have multiple PTO systems. For example, a work vehicle may include both a front PTO system for transferring power from the engine to an implement positioned in the front of the vehicle and a rear PTO system for transferring power from the engine to an implement positioned in the rear of the vehicle. In addition, PTO systems may also include more than one PTO clutch.

As shown in FIG. 2, the system 100 may also include a controller 124 configured to control the operation of one or more components of the work vehicle 10, such as the engine 102 and the PTO clutch 108. For example, the controller 124 may be communicatively coupled to an engine governor 126 in order to control and/or monitor the speed and/or torque of the engine 102. Similarly, the controller 124 may be communicatively coupled to the clutch valve 122 in order to control the operation of the PTO clutch 108. For instance, the controller 124 may be configured to transmit suitable current commands to the clutch valve 122 for controlling the engagement and/or disengagement of the PTO clutch 108.

It should be appreciated the controller 124 may generally comprise any suitable processor-based device known in the art. Thus, in several embodiments, the controller 124 may include one or more processor(s) 128 and associated memory 130 device(s) configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory 130 of the controller 124 may generally comprise memory element(s) including, but are not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory 130 may generally be configured to store suitable computer-readable instructions that, when implemented by the processor(s) 128, configure the controller 124 to perform various computer-implemented functions, such as the control algorithm 200 described below with reference to FIG. 3 and/or the method 300 described below with reference to FIG. 5. In addition, the controller 124 may also include various other suitable components, such as a communications circuit or module, one or more input/output channels, a data/control bus and/or the like.

It should also be appreciated that the controller 124 may correspond to an existing controller of the work vehicle 10 (e.g., an existing engine and/or transmission controller) or the controller 124 may correspond to a separate controller. For instance, in one embodiment, the controller 124 may form all or part of a separate plug-in module that may be installed within the work vehicle 10 to allow for the disclosed system and method to be implemented without requiring additional software to be uploaded onto existing control devices of the vehicle 10.

The system 100 may also include one or more sensors for monitoring various operating parameters of the work vehicle 10. For example, as shown in FIG. 2, the controller 124 may be communicatively coupled to various sensors, such as a torque sensor 132 and/or a speed sensor 134, mounted on and/or within the engine 102 for monitoring the engine torque loads and/or the engine speed. In one embodiment, the sensor(s) 132, 134 may comprise an internal sensor of the engine governor 126. In another embodiment, the system 100 may include any other suitable sensor(s) configured to monitor the torque loads and/or the speed of the engine 102. For instance, a suitable sensor 136 may be provided in association with the output shaft 110 of the engine 102 for monitoring the current engine speed. Regardless, by monitoring the engine torque and the engine speed via the sensor(s), the controller 124 may be allowed to continuously calculate the current engine power and engine load of the engine 102.

Moreover, the system 100 may also include one or more sensors 138, 140 (e.g., shaft encoders, shaft sensors and/or any other suitable speed sensors) configured to monitor the rotational speeds of the various shafts of the PTO system 106. For example, as shown in FIG. 2, the system 100 may include a first speed sensor 138 mounted to and/or within the PTO clutch input shaft 112 for monitoring the input speed of the PTO system 106 and a second speed sensor 140 mounted to and/or within the PTO clutch output shaft 116 for monitoring the output speed of the PTO system 106. The speed sensors 138, 140 may, in turn, be communicatively coupled to the controller 124 to permit the speed measurements to be transmitted to the controller 124 for subsequent processing and/or analysis. In other embodiments, as an alternative to including the first speed sensor 138, the input speed of the PTO system 106 may be determined based on the engine speed. For instance, by knowing the gear ratio provided between the engine output shaft 110 and the PTO clutch input shaft 112, the input speed of the PTO system 106 may be calculated based on the monitored engine speed.

In addition, the system 100 may include various other sensors configured to monitor any other suitable operating parameters of the work vehicle 10. For example, in one embodiment, a sensor 142 may be associated with the PTO clutch output shaft 116 and/or the input shaft 118 associated with the implement 104 for monitoring the torque transmitted through the PTO system 106 to the implement 104.

As shown in FIG. 2, the system 100 may also include one or more input devices 144, 146 communicatively coupled to the controller 124 to allow operator inputs to be provided to the system 100. For example, as indicated above, the work vehicle 10 may include an input device 144 (e.g., input lever 20 shown in FIG. 1) configured to permit an operator to input a speed command corresponding to a desired engine speed for the vehicle 10. Upon receipt of the speed command, the controller 124 may be configured to control the operation of the engine 102 in order to achieve the commanded engine speed. Similarly, as indicated above, the work vehicle 10 may include a suitable input device 146 (e.g., a button, switch or other suitable input device positioned on the control panel 22 shown in FIG. 1) to allow the operator to input a PTO-related command for engaging and/or disengaging the PTO clutch 108. For instance, upon receipt of a PTO engagement input from the operator, the controller 124 may be configured to control the operation of the clutch valve 122 so as to engage the PTO clutch 108, thereby allowing power to be transferred from the engine 102 to the associated implement 104. As will be described below, to allow for such control of the clutch valve 122, the controller 124 may be configured to implement a suitable control algorithm for determining a current command(s) to be transmitted to the clutch valve 122 that takes into account the magnitude of the inertial load provided by the implement 104. As such, a stable PTO clutch engagement may be achieved regardless of whether the implement inertial load is relatively high or relatively low.

Referring now to FIG. 3, a flow diagram of one embodiment of a control algorithm 200 that may be utilized to control the engagement of a PTO clutch of a work vehicle is illustrated in accordance with aspects of the present subject matter. In general, the control algorithm 200 will be described herein as being implemented by the controller 124 of the system 100 described above with reference to FIG. 2. However, it should be appreciated that the various processes described below may alternatively be implemented by a separate computing device or by a combination of computing devices.

As shown in FIG. 3, at (202), the control algorithm 200 includes initiating engagement of the PTO clutch 108. In several embodiments, the engagement of the PTO clutch 108 may be initiated upon receipt by the controller 124 of a suitable operator-initiated input. For example, as indicated above, a suitable input device 146 may be provided to allow the operator to transmit commands instructing the controller 124 to engage and/or disengage the PTO clutch 108. Thus, when an operator-initiated PTO engagement command is received (as indicated by arrow 220 in FIG. 3), the controller 124 may be configured to initiate engagement of the PTO clutch 108 by transmitting a suitable current command(s) to the clutch valve 122 for adjusting the pressure of the hydraulic fluid supplied to the clutch 108.

In several embodiments, the controller 124 may be configured to initiate engagement of the PTO clutch 108 by initially increasing the current supplied to the clutch valve 122 at a predetermined ramp-up rate for a relatively short period of time (e.g., 50-100 milliseconds). For instance, the controller 124 may be configured to increase the current supplied to the clutch valve 122 at the predetermined rate until it is detected that the PTO clutch output shaft 116 is rotating at a predetermined minimum engagement speed, thereby indicating that the PTO clutch 108 has been actuated beyond its kiss point and is partially engaged. At such point, the controller 124 may be configured to transition from controlling the current supplied to the clutch valve 122 based on the predetermined ramp-up rate to controlling the current based on the various portions of the control algorithm 200 described below (e.g., boxes 204-212) to allow the PTO clutch 108 to be further engaged in a manner that minimizes engine lug-down while limiting both the instantaneous clutch power and the total clutch engagement energy for the PTO clutch 108 below predefined thresholds.

As shown in FIG. 3, at (204), the control algorithm 200 includes calculating or estimating the time remaining to complete the engagement of the PTO clutch 108 (referred to hereinafter as the "remaining clutch engagement time"). In general, the remaining clutch engagement time corresponds to a time value calculated periodically by the controller 124 that represents an estimate of the amount of time remaining to bring the PTO clutch 108 from its current state (e.g., a partially engaged state) to a fully engaged state (e.g., where the rotational speed of the PTO clutch input shaft 112 is equal or substantially equal to the rotational speed of the PTO clutch output shaft 116). Given that the remaining clutch engagement time will continuously change as the state of the PTO clutch 108 transitions from a partially engaged state to its fully engaged state, the controller 124 may be configured to calculate an updated time value at each calculation interval for the controller 124 (e.g., every 10-50 milliseconds). Thus, at each calculation interval, an updated remaining clutch engagement time may be provided by the controller 124 for use as an input for subsequent operations.

In several embodiments, the remaining clutch engagement time may be calculated at any given time based on both a calculated clutch slippage energy corresponding to the energy that has been previously generated due to slipping of the PTO clutch plates 109 between initiation of the clutch engagement and the current calculation interval (indicated by box 222 in FIG. 3) and a maximum clutch engagement energy associated with the PTO clutch (indicated by arrow 224 in FIG. 3). By using such input signals, the remaining clutch engagement time may be calculated by the controller 124 in a manner that takes into account both the inertial load derived from the implement 104 being coupled to the engine 102 via the PTO clutch 108 and the total clutch energy that can be accommodated by the clutch 108 during clutch engagement. Specifically, the clutch slippage energy generated while the PTO clutch 108 is getting engaged will generally vary based on the inertial load derived from the implement 104. As a result, the remaining clutch engagement time calculated by the controller 124 may be highly dependent on the implement inertial load.

It should be appreciated that the clutch slippage energy generated while the PTO clutch 108 is getting engaged may generally be calculated or estimated using any suitable energy estimation technique known in the art. However, in several embodiments of the present subject matter, the clutch slippage energy may be calculated as a function of both the clutch torque for the PTO clutch 108 and the rotational speeds of the PTO clutch input and output shafts 112, 116. For example, in a particular embodiment, the clutch slippage energy that has been generated during the present clutch engagement process may be calculated using the following Equation (Equation 1):

$$E_{cl}(t) = \int_0^t \tau_{cl}(t)(\omega_{in}(t) - \omega_{out}(t))dt \quad (1)$$

wherein, $E_{cl}(t)$ corresponds to the total amount of clutch slippage energy that has been generated by the PTO clutch 108 until time stamp (t) during the present clutch engagement process (i.e., the total clutch slippage energy from initiation of the present clutch engagement to the current time stamp (t)), $\tau_{cl}(t)$ corresponds to the clutch torque for the PTO clutch 108 at the current time stamp (t), $\omega_{in}(t)$ corresponds to the rotational speed of the PTO clutch input shaft 112 at the current time stamp (t), and $\omega_{out}(t)$ corresponds to the rotational speed of the PTO clutch output shaft 116 at the current time stamp (t).

It should also be appreciated that, used herein, the term "maximum clutch engagement energy" generally corresponds to the total amount of clutch energy that can be transferred through the PTO clutch 108 across the time period along which the PTO clutch 108 is getting engaged without causing damage to the clutch 108. In other words, to prevent damage occurring to the PTO clutch 108, the total clutch energy transferred through the clutch 108 from initiation of clutch engagement to completion of clutch engagement should be equal to or less than the maximum clutch engagement energy. In general, the maximum clutch engagement energy can be expressed according to the following equation (Equation 2):

$$E_{clmax} = E_{cl}(t) + \int_t^T \tau_{cl}(t)(\omega_{in}(t) - \omega_{out}(t))dt \quad (2)$$

wherein, $E_{clmax}$ corresponds to the maximum clutch engagement energy for the PTO clutch 108, $E_{cl}(t)$ corresponds to the total amount of clutch slippage energy that has been generated by the PTO clutch 108 until time stamp (t) during the present clutch engagement process, $\tau_{cl}(t)$ corresponds to the clutch torque for the PTO clutch 108 at the current time stamp (t), $\omega_{in}(t)$ corresponds to the rotational speed of the PTO clutch input shaft 112 at the current time stamp (t), $\omega_{out}(t)$ corresponds to the rotational speed of the PTO clutch output shaft 116 at the current time stamp (t) and T corresponds to the final time stamp at which it is estimated that the current clutch engagement process will be completed (e.g., the estimated time at which the rotational speed of the PTO clutch input shaft 112 will be equal or substantially equal to the rotational speed of the PTO clutch output shaft 116).

In several embodiments, the maximum clutch engagement energy ($E_{clmax}$) may correspond to a predefined or predetermined value for the PTO clutch 108 that is stored within the controller's memory 130. For example, the maximum clutch engagement energy for the PTO clutch 108 may be determined empirically via lab testing or by using suitable modeling software (e.g. by performing a finite element analysis on a computer model of the PTO clutch 108). Alternatively, the maximum clutch engagement energy may be provided by the clutch manufacturer. Regardless, by knowing the maximum clutch engagement energy and by solving Equation 2 above, the remaining clutch engagement time may be calculated. A simple expression relating the final time stamp (T) from Equation 2 to the remaining clutch engagement time is provided below (Equation 3):

$$t_{rem} = T - t \quad (3)$$

wherein, $t_{rem}$ corresponds to the remaining clutch engagement time, T corresponds to the final time stamp estimated for completion of the clutch engagement and t corresponds to the current time stamp.

Referring still to FIG. 3, after the determining the remaining clutch engagement time at the current time stamp, the control algorithm 200 may, at (206), include calculating a new PTO clutch toque command for the next time stamp based on the remaining clutch engagement time calculated at the current time stamp. Specifically, by knowing the remaining clutch engagement time at the current time stamp, a torque ramp rate may be determined that provides for the clutch torque to be increased from the current clutch torque to the new clutch torque for the next time stamp. For example, in one embodiment, the torque ramp rate and the corresponding torque command may be calculated using the following equations (Equations 4 and 5):

$$K_\tau(t) = \frac{(\tau_{clmax} - \tau_{cl}(t))}{t_{rem}} \quad (4)$$

$$\tau_{cl}(t + \Delta t) = \tau_{cl}(t) + K_\tau(t) * \Delta t \quad (5)$$

wherein, $K_\tau(t)$ corresponds to the torque ramp rate calculated at the current time stamp (t), $\tau_{clmax}$ corresponds to the maximum allowable clutch torque for the PTO clutch (indicated by arrow 226 in FIG. 3), $\tau_{cl}(t)$ corresponds to the clutch torque for the PTO clutch 108 at the current time stamp (t), $t_{rem}$ corresponds to the remaining clutch engagement time, $\tau_{cl}(t+\Delta t)$ corresponds to the new torque command for the PTO clutch 108 and $\Delta t$ corresponds to the calculation interval for the controller 124.

It should be appreciated that, in several embodiments, the maximum allowable clutch torque ($\tau_{clmax}$) may correspond to a predefined or predetermined value for the PTO clutch 108 that is stored within the controller's memory. For example, the maximum clutch engagement energy for the PTO clutch 108 may be determined empirically via lab testing or otherwise calculated based on known parameters associated with the clutch 108. Alternatively, the maximum allowable clutch torque may be provided by the clutch manufacturer.

As indicated above, using equations 4 and 5, the new torque command ($\tau_{cl}(t+\Delta t)$) may be calculated based on both the remaining clutch engagement time ($t_{rem}$) and the maximum allowable clutch torque ($T_{clmax}$) for the PTO clutch 108. Specifically, by knowing the remaining clutch engagement time, a torque ramp rate ($K_\tau(t)$) may be calculated such that the clutch torque is increased over the remaining clutch engagement time from its current clutch torque to its maximum allowable clutch torque. FIG. 4 illustrates a graphical representation of an example of the calculated torque ramp rate ($K_\tau(t)$), which generally corresponds to the slope of the line 280 extending between the current clutch torque ($\tau_{cl}(t)$) and the maximum allowable clutch torque ($\tau_{clmax}$) for the PTO clutch 108. As shown, using the calculated torque ramp rate, the new torque command ($\tau_{cl}(t+\Delta t)$) may be calculated based on the calculation interval ($\Delta t$) for the controller 124.

It should be appreciated that, during the clutch engagement, the final time stamp (T) calculated by the controller 124 may change over time (e.g., as indicated by the dashed arrows 282, 284 in FIG. 4) due to variations in the implement load and/or any other clutch parameters occurring as the clutch 108 is getting engaged. Such changes in the final time stamp (T) not only impact the remaining clutch engagement time but also result in variations in the required torque ramp rate. For example, as shown in FIG. 4, if the final time stamp (T) shifted in the direction of arrow 282 (indicating that the controller 124 has determined that the clutch engagement will be completed earlier than previously anticipated), the torque ramp rate ($K_\tau(t)$) will need to be increased to ensure that the clutch torque will be ramped-up to the maximum allowable clutch torque for the PTO clutch 108 by the final time stamp (T). Similarly, if the final time stamp (T) shifted in the direction of arrow 284 (indicating that the controller 124 has determined that the clutch engagement will be completed later than previously anticipated), the torque ramp rate will need to be decreased to ensure that the clutch torque will not be ramped-up to the maximum allowable clutch torque for the PTO clutch 108 prior to completion of the clutch engagement (assuming that the clutch torque is not already at the maximum allowable clutch torque). Thus, those of ordinary skill in the art should appreciate that a new torque ramp rate may need to be calculated by the controller 124 at each calculation interval to account for variations in the implement load and/or any other clutch parameters occurring as the clutch 108 is getting engaged.

It should also be appreciated that the clutch torque may generally vary with respect to time in a non-linear manner (e.g., as indicated by the solid portion 286 of the curve shown in FIG. 4 that is defined prior to the current time stamp (t)). However, as shown in FIG. 4, a linear relationship is defined between the clutch torque and the clutch engagement time using the calculated torque ramp rate ($K_\tau(t)$) in order to allow for the calculation of the new torque command ($\tau_{cl}(t+\Delta t)$).

Referring back to FIG. 3, at (208), the control algorithm 200 includes limiting the torque command, if necessary, based on a maximum instantaneous clutch power constraint associated with the PTO clutch 108. Specifically, in several embodiments, the increase in the new torque command over the previous torque command may be limited, if necessary, to ensure that the instantaneous clutch power for the PTO clutch 108 does not exceed its corresponding maximum instantaneous clutch power constraint. For example, the torque command 228 may be limited such that the following condition is satisfied (Equation 6):

$$P(t+\Delta t) \leq P_{max} \quad (6)$$

wherein, $P(t+\Delta t)$ corresponds to the estimated clutch power at time stamp ($t+\Delta t$) based on the new torque command ($\tau_{cl}(t+\Delta t)$) and $P_{max}$ corresponds to the maximum instantaneous clutch power constraint for the PTO clutch 108 (e.g., as indicated by arrow 250 in FIG. 3).

It should be appreciated that, in several embodiments, the maximum instantaneous clutch power constraint ($P_{max}$) may correspond to a predefined or predetermined value for the PTO clutch 108 that is stored within the controller's memory 130. For example, the maximum instantaneous clutch power constraint may be determined empirically via lab testing or by using suitable modeling software (e.g. by performing a finite element analysis on a computer model of the PTO clutch 108). Alternatively, the maximum instantaneous clutch power constraint may be provided by the clutch manufacturer. Regardless, by knowing the maximum instantaneous clutch power constraint, the controller 124 may be configured to calculate a torque command corresponding to the maximum allowable torque that may be currently commanded by the controller 124 while still satisfying the condition shown in Equation 6. The controller 124 may then limit the torque command 230 output from box 208 to the minimum of the torque command determined using Equation 5 and the maximum allowable torque determined based on the condition shown above in Equation 6.

Additionally, as shown in FIG. 3, at (210), the control algorithm 200 may also include limiting the torque command, if necessary, to prevent engine stall. Specifically, in several embodiments, the increase in the torque command over the previous torque command may be limited, if necessary, to ensure that engine lug-down is minimized. For example, in a particular embodiment, the controller 124 may be configured to compare the commanded engine speed 232 for the engine 102 (e.g., based on the speed command provided from the operator via the input device 144 shown in FIG. 2) to the actual engine speed 234 for the engine 102 (e.g., based on the measurement provided by the speed sensor(s) 134, 136 shown in (FIG. 2)). In such an embodiment, if the difference between the commended engine speed and the actual engine speed exceeds a predetermined speed threshold (thereby indicating that the engine 102 is lugging down), the controller 124 may be configured to appropriately limit the torque command 230 to prevent engine stall.

As shown in FIG. 3, the controller 124 may be configured to generate a final torque command (indicated by arrow 240) corresponding to the calculated and/or limited torque command resulting from the operations represented by boxes 206-210. This final torque command 240 may then be converted to a corresponding current command (indicated by arrow 242 in FIG. 3). Specifically, as shown in FIG. 3, at (212), the control algorithm 200 may include calculating a current command based on the final torque command. As is generally understood, the final torque command may be converted to a current command using known conversion factors associated with both the relationship between the current supplied to the control valve 122 and the corresponding pressure of the hydraulic fluid within the PTO clutch 108 and the relationship between the clutch pressure and the corresponding clutch torque. For example, the conversion between the final torque command 240 and the current command 242 may be expressed generically according to the following equations (Equations 7 and 8):

$$\mathrm{Prs}(t+\Delta t) = K_{\tau 2p} * \tau_{final}(t+\Delta t) \quad (7)$$

$$i(t+\Delta t) = K_{p2i} * \mathrm{Prs}(t+\Delta t) \quad (8)$$

wherein, $\tau_{final}(t+\Delta t)$ corresponds to the final torque command 240 received at box 240, $K_{\tau 2p}$ corresponds to the torque-to-pressure conversion factor associated with the PTO clutch 108, $\mathrm{Prs}(t+\Delta t)$ corresponds to the clutch pressure calculated based on the final torque command 240, $K_{p2i}$ corresponds to the pressure-to-current conversion factor associated with the clutch valve 122 and $i(t+\Delta t)$ corresponds to the current command calculated based on the determined clutch pressure ($\mathrm{Prs}(t+\Delta t)$).

As shown in FIG. 3, the current command calculated at box 212 may be transmitted by the controller 224 to the clutch valve 122 in order to control the operation of the valve 122. The various operations of the control algorithm 200 (e.g., as represented by boxes 204-212) may then be repeated at each calculation interval for the controller 124 to allow for the current command transmitted to the clutch valve 122 to be dynamically adjusted in a manner that provides for the desired clutch engagement of the PTO clutch 108.

It should be appreciated that, in several embodiments, the adaptive control provided by the control algorithm 200 at boxes 204-212 may be repeated at each calculation interval for the controller 124 until the difference between the rotational speed of the PTO clutch input shaft 112 and the rotational speed of the PTO clutch output shaft 116 is less than a predetermined threshold value, thereby indicating that the clutch engagement is nearing completion. At such point, the controller 124 may be configured to transition control of the valve current to a fixed-rate control during which the current command to the clutch valve 122 is increased at a predetermined ramp-up rate (or kept constant) until the clutch engagement is completed. For example, once the difference between clutch input and output speeds is less than the predetermined threshold value, the controller 124 may be configured to increase the current supplied to the clutch valve 122 at the predetermined rate until it is detected that the PTO clutch output shaft 116 is rotating at the same or substantially the same speed as the PTO clutch input shaft 112.

It should also be appreciated that the controller 124 may, in several embodiments, be configured to terminate the engagement of the PTO clutch 108 in the event that it does not appear likely that the clutch 108 will be able to be engaged without damage occurring to the clutch 108. For example, the controller 124 may be configured to terminate the clutch engagement by ramping down the current supplied to the clutch valve 122 at a predetermined ramp-down rate if the difference between the rotational speed of the PTO clutch input shaft 112 and the rotational speed of the PTO clutch output shaft 116 remains greater than a predefined threshold valve for a period of time exceeding a predetermined time threshold. Such an event may occur, for instance, if the inertial load associated with the implement 104 being coupled to the engine 102 via the PTO clutch 108 exceeds the capabilities of the clutch 108.

Referring now to FIG. 5, a flow diagram of one embodiment of a method 300 for controlling the engagement of a PTO clutch of a work vehicle is illustrated in accordance with aspects of the present subject matter. In general, the method 300 will be described herein with reference to the system 100 described above with reference to FIG. 2 and the control algorithm 200 described above with reference to FIG. 3. However, it should be appreciated by those of ordinary skill in the art that the disclosed method 300 may be implemented within any other system and/or using any other suitable control algorithm. In addition, although FIG. 5 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 5, at (302), the method 300 may include transmitting a control signal associated with initiating engagement of the PTO clutch. For example, upon the receipt of a suitable operator-initiated input, the controller 124 may be configured to initiate engagement of the PTO clutch 108 by transmitting a suitable current command to the clutch valve 122 in order to increase the pressure of the hydraulic fluid supplied to the clutch 108. As indicated above, in one embodiment, the controller 124 may be configured to initiate engagement of the PTO clutch 108 by increasing the current command to the clutch valve 122 at a predetermined ramp-up rate until the PTO clutch output shaft 116 is rotating at a predetermined minimum engagement speed, thereby indicating that the PTO clutch 108 has been actuated beyond its kiss point and is partially engaged. At such point, the controller 124 may then be configured to transition its control to the various portions of the control algorithm 200 described above (e.g., boxes 204-212).

Additionally, at (304), the method 300 includes determining the energy generated during the clutch engagement due to clutch slippage (i.e., slippage of the PTO clutch plates 109). Specifically, as indicated above, the controller 124 may, in one embodiment, be configured to calculate the clutch slippage energy based on the relationship shown in Equation 1. For instance, the clutch slippage energy may be calculated generally as a function of the rotational speeds of the PTO clutch input and output shafts 112, 116 and the clutch torque associated with the PTO clutch 108.

Moreover, at (306), the method 300 includes calculating, while the PTO clutch is getting engaged, a clutch engagement time remaining until engagement of the PTO clutch is completed based on the clutch slippage energy and a maximum clutch engagement energy associated with the PTO clutch. For example, as indicated above, the controller 124 may be configured to calculate the remaining clutch engagement time using Equations 1 and 2.

Referring still to FIG. 5, at (308), the method 300 includes determining a torque command for controlling engagement of the PTO clutch as a function of the remaining clutch engagement time. As indicated above, in several embodiments, the torque command may be calculated by initially determining a torque ramp rate for the PTO clutch 108 based on both the remaining clutch engagement time and the maximum allowable clutch torque for the PTO clutch 108. The torque ramp rate may then be used to calculate a corresponding torque command for the PTO clutch 108. In addition, as described above, the calculated toque command may also be limited, as necessary, to prevent the instantaneous clutch power for the PTO clutch 108 from exceeding its maximum instantaneous clutch power constraint (e.g., box 208 from FIG. 2) and/or to prevent engine stall (e.g., box 210 from FIG. 2).

Additionally, at (310), the method 300 includes controlling the engagement of the PTO clutch based on the torque command. For example, as indicated above, a current command may be calculated based on the final torque command determined for the PTO clutch (e.g., the torque command 240 as calculated and/or limited at boxes 206-210). The current command may then be transmitted to the clutch valve 122 in order to control its operation in a manner that results in the desired clutch engagement for the PTO clutch 108.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for controlling engagement of a power take-off (PTO) clutch of a work vehicle, the method comprising:

transmitting, by a computing device, a control signal associated with initiating engagement of the PTO clutch;

determining, by the computing device, a clutch slippage energy generated during engagement of the PTO clutch due to clutch slippage;

while the PTO clutch is getting engaged, calculating, by the computing device, a clutch engagement time remaining until engagement of the PTO clutch is completed based on the clutch slippage energy and a maximum clutch engagement energy associated with the PTO clutch;

determining, by the computing device, a torque command for controlling engagement of the PTO clutch as a function of the remaining clutch engagement time; and controlling, by the computing device, the engagement of the PTO clutch based on the torque command.

2. The method of claim 1, wherein the maximum clutch engagement energy corresponds to a predetermined energy value associated with a total amount of clutch energy that can be transferred through the PTO clutch across a time period along which the PTO clutch is getting engaged.

3. The method of claim 1, further comprising determining a current command for controlling the engagement of the PTO clutch based on the torque command, wherein controlling the engagement of the PTO clutch comprises transmitting the current command to a clutch valve associated with the PTO clutch.

4. The method of claim 3, further comprising:
comparing an input speed associated with the PTO clutch to an output speed associated with the PTO clutch; and
increasing the current command at predetermined ramp rate when a difference between the input speed and the output speed is less than a predetermined threshold.

5. The method of claim 1, wherein determining the torque command comprises:
calculating a torque ramp rate for the PTO clutch based on the remaining clutch engagement time and a maximum allowable clutch torque for the PTO clutch; and
determining the torque command based on the torque ramp rate.

6. The method of claim 1, further comprising limiting the torque command used to control the engagement of the PTO clutch based on an instantaneous clutch power constraint associated with the PTO clutch.

7. The method of claim 6, wherein limiting the torque command based on the instantaneous clutch power constraint comprises:
determining a maximum allowable instantaneous torque command for the PTO clutch based on the instantaneous clutch power constraint; and
limiting the torque command to the maximum allowable instantaneous torque command if the torque command exceeds the maximum allowable instantaneous torque command.

8. The method of claim 1, further comprising:
monitoring an engine speed of an engine of the work vehicle; and
comparing the engine speed to a commanded engine speed for the work vehicle; and
if a difference between the engine speed and the commanded engine speed exceeds a predetermined speed threshold, limiting an increase in the torque command used to control the engagement of the PTO clutch.

9. The method of claim 1, wherein the clutch slippage energy is determined based on input and output speeds associated with the PTO clutch and a clutch torque associated with the PTO clutch.

10. The method of claim 1, wherein transmitting the control signal associated with initiating engagement of the PTO clutch comprises transmitting one or more control commands associated with increasing a clutch current supplied to a clutch valve associated with the PTO clutch at a predetermined ramp rate so as to initiate engagement of the PTO clutch.

11. The method of claim 10, wherein the clutch current is increased at the predetermined ramp rate until an output speed associated with the PTO clutch exceeds a predetermined speed threshold.

12. A system for controlling clutch engagement for a work vehicle, the system comprising:
a power take-off (PTO) clutch configured to rotationally couple a PTO clutch input shaft to a PTO clutch output shaft;
a clutch valve configured to control engagement of the PTO clutch; and
a controller communicatively coupled to the clutch valve, the controller including a processor and associated memory, the memory storing instructions that, when implemented by the processor, configure the controller to:
transmit a control signal associated with initiating engagement of the PTO clutch;
determine a clutch slippage energy generated during engagement of the PTO clutch due to clutch slippage;
while the PTO clutch is getting engaged, calculate a clutch engagement time remaining until engagement of the PTO clutch is completed based on the clutch slippage energy and a maximum clutch engagement energy associated with the PTO clutch;
determine a torque command for controlling engagement of the PTO clutch as a function of the remaining clutch engagement time; and
control the engagement of the PTO clutch based on the torque command.

13. The system of claim 12, wherein the maximum clutch engagement energy corresponds to a predetermined energy value associated with a total amount of clutch energy that can be transferred through the PTO clutch across a time period along which the PTO clutch is getting engaged.

14. The system of claim 12, wherein the controller is further configured to determine a current command based on the torque command, the current command being used to control the operation of the clutch valve.

15. The system of claim 14, wherein the controller is configured to compare an input speed of the PTO clutch input shaft to an output speed of the PTO clutch output shaft, the controller being further configured to increase the current command at a predetermined ramp rate when a difference between the input speed and the output speed is less than a predetermined threshold.

16. The system of claim 12, wherein the controller is further configured to calculate a torque ramp rate for the PTO clutch based on the remaining clutch engagement time and a maximum allowable clutch torque for the PTO clutch, the torque command being determined based on the torque ramp rate.

17. The system of claim 12, wherein the controller is further configured to limit the torque command used to control the engagement of the PTO clutch based on an instantaneous clutch power constraint associated with the PTO clutch.

18. The system of claim 17, wherein the controller is configured to determine a maximum allowable instantaneous torque command for the PTO clutch based on the instantaneous clutch power constraint, wherein the controller is configured to limit the torque command to the maximum allowable instantaneous torque command if the torque command exceeds the maximum allowable instantaneous torque command.

19. The system of claim 12, wherein the controller is further configured to monitor an engine speed of an engine of the work vehicle and compare the engine speed to a commanded engine speed for the work vehicle, the controller being configured to limit an increase in the torque command if a difference between the engine speed and the commanded engine speed exceeds a predetermined threshold.

20. The system of claim 13, wherein the clutch slippage energy is determined based on input and output speeds associated with the PTO clutch and a clutch torque associated with the PTO clutch.

* * * * *